(12) United States Patent
Wardhaugh et al.

(10) Patent No.: US 9,073,006 B2
(45) Date of Patent: Jul. 7, 2015

(54) GAS LIQUID CONTACTOR

(75) Inventors: Leigh Thomas Wardhaugh, Stockton (AU); Donald Ross Chase, Bateau Bay (AU); Edward Anthony Garland, Branxton (AU); Christopher Baard Solnordal, Surrey Hills (AU)

(73) Assignee: Commonwealth Scientific and Industrial Research Organisation (AU)

( * ) Notice: Subject to any disclaimer, the term of this patent is extended or adjusted under 35 U.S.C. 154(b) by 0 days.

(21) Appl. No.: 13/982,502

(22) PCT Filed: Feb. 3, 2012

(86) PCT No.: PCT/AU2012/000100
§ 371 (c)(1),
(2), (4) Date: Jul. 30, 2013

(87) PCT Pub. No.: WO2012/103596
PCT Pub. Date: Aug. 9, 2012

(65) Prior Publication Data
US 2013/0305923 A1 Nov. 21, 2013

(30) Foreign Application Priority Data
Feb. 3, 2011 (AU) ................................ 2011900343

(51) Int. Cl.
*B01F 3/04* (2006.01)
*B01D 47/00* (2006.01)
(Continued)

(52) U.S. Cl.
CPC .......... *B01D 53/185* (2013.01); *B01F 3/04078* (2013.01); *B01F 3/04035* (2013.01);
(Continued)

(58) Field of Classification Search
CPC .... B01F 3/04; B01F 3/04007; B01F 3/04078; B01F 3/04035; B01D 47/00; B01D 47/08
USPC .......................... 261/74, 83, 118; 96/281, 286
See application file for complete search history.

(56) References Cited

U.S. PATENT DOCUMENTS 3,011,769 A * 12/1961 Umbricht .......................... 261/3
3,170,965 A * 2/1965 Jamison et al. ................. 96/282
(Continued)

FOREIGN PATENT DOCUMENTS

| CN | 101721830 A | 6/2010 |
|---|---|---|
| JP | 2009-052799 A | 3/2009 |
| WO | WO 2010/105351 A1 | 9/2010 |

OTHER PUBLICATIONS

International Search Report and Written Opinion for International Patent Application No. PCT/AU2012/000100 (mailed Apr. 24, 2012).

*Primary Examiner* — Robert A Hopkins
(74) *Attorney, Agent, or Firm* — Merchant & Gould P.C.

(57) ABSTRACT

A gas and liquid contacting vessel comprises a distributor apparatus. The distributor apparatus comprising at least one housing rotatable about an axis of the housing for receiving liquid. Each rotatable housing having a distributor region comprising at least one liquid outlet or arrangement of liquid outlets formed in the housing from which liquid is projected from the housing as at least one liquid sheet onto an inner wall of the vessel. A pressurised source of liquid such as via a pump for providing liquid through the liquid outlets in the distributor apparatus to project liquid from the housing at least initially, in a stream of liquid extending continuously along the length of the liquid outlet corresponding to the inner wall of the vessel, and a gas inlet communicating with the gas liquid contacting space, the gas inlet directing gas into contact with the liquid sheets projected from the outlets in the housing.

8 Claims, 6 Drawing Sheets

(51) Int. Cl.
  *B01D 53/18* (2006.01)
  *B01D 47/08* (2006.01)
  *B01D 53/78* (2006.01)
  *B01D 1/14* (2006.01)
  *B01D 1/22* (2006.01)
  *B01D 3/08* (2006.01)
  *B01D 53/14* (2006.01)
  *B01D 53/62* (2006.01)

(52) U.S. Cl.
  CPC ............... *B01D47/08* (2013.01); *B01D 53/62* (2013.01); *B01D 53/78* (2013.01); *B01D 2257/302* (2013.01); *B01D 2257/404* (2013.01); *B01D 2257/504* (2013.01); *B01D 2257/708* (2013.01); *B01D 1/14* (2013.01); *B01D 1/223* (2013.01); *B01D 3/08* (2013.01); *B01D 53/1475* (2013.01)

(56) References Cited

U.S. PATENT DOCUMENTS

| 3,347,535 | A | * | 10/1967 | Schimpke | 261/29 |
| 3,495,813 | A | * | 2/1970 | Marenghi et al. | 266/202 |
| 3,969,093 | A | * | 7/1976 | Murray, Jr. | 96/281 |
| 4,294,781 | A | * | 10/1981 | Holmquist | 261/89 |
| 4,594,081 | A | * | 6/1986 | Kroll et al. | 96/235 |
| 2012/0031275 | A1 | * | 2/2012 | Yun | 96/309 |

* cited by examiner (a) MULTI-START HELIX (b) BLADE SLOT DESIGN

GAS LIQUID CONTACTOR

This application is a U.S. National Stage Application under 35 U.S.C. §371 of International Patent Application No. PCT/AU2012/000100 filed 3 Feb. 2012, which claims the benefit of priority to Australian Patent Application No. 2011900343 filed 3 Feb. 2011, the disclosures of all or which are incorporated by reference herein in their entireties. The International Application was published in English on 9 Aug. 2012 as WO 2012/103596. To the extent appropriate, a claim of priority is made to each of the above disclosed applications.

FIELD OF THE INVENTION

This invention relates to a gas-liquid contacting device. The invention is applicable to technical areas where gas streams and liquid streams are brought together with the intent of transferring mass, momentum or heat.

BACKGROUND OF THE INVENTION

Post-Combustion $CO_2$ capture (PCC) technologies seek to eliminate $CO_2$ from the exhaust of existing stationary fossil fuel burning facilities such as coal or gas fired power stations, cement kilns or furnaces by adding a retrofit plant with minimal disruption to the existing facility.

The total cost of $CO_2$ capture from power station flue gases and compression to pipeline conditions has been estimated to be competitive with other carbon avoidance technologies but significantly above the cost of carbon emissions considered economically acceptable. Thus to be economically acceptable, the difference between the cost of capture and the proposed cost to emit must be met with technical developments that substantially reduce the capital and operating cost of PCC plant.

The conventional PCC process is centred on packed beds with, in the latest developments, customized structured packing and an 'advanced' solvent package of blended amines, promoters, anti-corrosion and foam suppressing additives. Packed beds represent a very high interfacial area density (area per unit volume), however, the opportunity for further improvement is limited by the fact that the energy necessary to create surface area by distributing the liquid over the packing surface is provided by gravity alone while the tower diameter is fixed by the maximum allowable gas velocity to limit liquid entrainment or prevent flooding. For a given solvent package and throughput of flue gas (project scale) the size of the column is essentially fixed.

Conventional packed bed designs have limitations in respect to mass transfer performance and the ability of a single design to handle a range of liquid properties (e.g. viscosity).

It is an object of the invention to overcome one or more of the limitations of existing gas absorption/desorption in general and more specifically those used in PCC processes to a significant extent by introducing a different mechanism of contact between the gas and the liquid. The invention enables a liquid sheet to take on duel functionalities of a mass transfer medium and preferably a gas conveyance means. This is achieved through the liquid sheet forming at least part of a gas channel wall, with this liquid sheet possessing rotational motion such that the gas is conveyed along the gas channel or pathway in an analogous fashion to the operation of a metering screw, auger, fan or turbine. The invention advantageously controls the fluid dynamics between the phases without the need of metal packing surfaces and by adding energy more efficiently via the liquid phase which is then transferred to the gas phase.

In a first aspect, the invention provides, a gas and liquid phase contactor comprising
a vessel comprising an inner wall; a pressurised source of liquid; and a gas inlet communicating with a gas and liquid phase contacting space within the vessel,
a distributor apparatus for distributing liquid in the vessel, comprising
at least one housing rotatable about an axis of the housing;
each rotatable housing having a distributor region comprising at least one liquid outlet or arrangement of liquid outlets arranged in a formation in and around the housing for directing liquid through the gas liquid contacting space towards the inner wall of the vessel,
the distributor apparatus having a liquid inlet for introducing liquid into the housing from the pressurised source of liquid and providing pressurised liquid to the at least one liquid outlet or arrangement of liquid outlets, the pressurised liquid in the housing projecting from the housing as at least one liquid sheet rotating around a central axis of the housing towards the inner wall of the vessel; the liquid sheets having two sides and the gas inlet directing gas through the gas liquid contacting space into contact with each side of the at least one liquid sheets projected from the outlets in the housing.

The liquid outlets may be a slit shaped orifice or arrangement of slit shaped orifices formed in the distributor region of the housing. The liquid outlets formed in the wall of the housing communicate with the interior of the housing thus providing a passage for liquid through the housing wall. The liquid outlets form an arrangement representing a curve in and around the external surface of the housing extending across the surface of the distributor region of the housing. The liquid outlets may be spaced around the housing in a helical, spiral or other suitable arrangement and shaped to project liquid from the interior of the housing in a liquid sheet. The pitch of the liquid outlets is preferably in the range of 0.2 to 6 times the liquid distributor outer diameter, more preferably 3 to 3.5 times liquid distributor outer diameter.

Within the context of the invention, a helical arrangement or helix includes arrangements where outlets form a curve around the housing with a constant or varying pitch and also spiral arrangements which may not fall within the mathematical definition of a helix but have the appearance of a helix.

The apparatus for distributing liquid is preferably positioned within a vessel and provided with a liquid inlet communicating with a distributor apparatus for distributing liquid within a gas and liquid phase contacting space in the vessel. The liquid distributing apparatus may further be provided with a source of pressurised liquid such as providing liquid via a pump through the liquid outlets in the distributor apparatus to project liquid from the housing at least initially, in a stream of liquid extending continuously along the length of the liquid outlet corresponding to the arrangement, and a gas inlet communicating with the gas liquid contacting space, the gas inlet directing gas into contact with the liquid sheets projected from the outlets in the housing.

In a second aspect there is provided a distributor apparatus for distributing liquid in a vessel, comprising:
at least one housing rotatable about an axis of the housing;
each rotatable housing having a distributor region comprising at least one liquid outlet or arrangement of liquid outlets arranged in a helical or spiral formation in and around the housing for directing liquid through the gas liquid contacting space towards the inner wall of the vessel, the distributor apparatus having a liquid inlet for introducing liquid into the housing from the pressurised source of liquid and providing pressurised liquid to the at least one liquid outlet or arrangement of liquid outlets, the pressurised liquid in the housing projecting from the housing as at least one liquid sheet rotating around a central axis of the housing towards the inner wall of the vessel; the liquid sheets having two sides and the gas inlet directing gas through the gas liquid contacting space into contact with each side of the at least one liquid sheets projected from the outlets in the housing.

The design of the vessel (length and diameter) and the housing (length, inside and outside diameter and the shape of the liquid outlet or outlets in the housing) is optimized to suit the design basis of the system and the physical properties of the gas and liquid streams. The gas flowrate, the liquid flowrate, the rotation rate of the housing and the width of the liquid distributor slit are parameters that are preferably adjustable in operation by a processor having a control algorithm to enable the liquid outlets to distribute the liquid as sheets across the majority, if not all of the space between the liquid distributor outlet and the vessel wall thus maximizing the overall performance in terms of mass, momentum and heat transfer as required by the system.

The housing and the inner wall of the vessel are preferably separated by a void. The void functions as a space for which the liquid sheets can be projected, enabling each side of the liquid sheet to interface with a gaseous phase, when the contactor in operation. The void is preferably annular.

The contactor further comprises a pressurised source of liquid, preferably a pump connect to a source of water, for providing liquid through the liquid outlets in the distributor apparatus to project liquid from the housing at least initially, in a stream of liquid extending continuously along the length of the liquid outlet corresponding to the arrangement.

Preferably, the contactor further comprises a rotational drive arrangement to rotate the distributor apparatus about its axis of rotation. The distributor apparatus is preferably rotated at in excess of 1 rpm, more preferably at least 10 rpm and even more preferably at least 100 rpm and yet even more preferably at least 500 rpm. The greater the rotational speed the higher the throughput of the contactor.

The rotational motion exerted upon the liquid sheets has a number of advantages including:
- improving mass transfer between the gaseous and liquid phase;
- reducing entrainment of the gas in the liquid phase;
- stabilising the liquid sheet thereby enabling thinner continuous sheets to be formed; and
- imparting a pumping or driving motion to the gas to pump or drive the gas through the gas/liquid contacting space.

The housing of the liquid distributor may be axially aligned with the gas and liquid phase contacting space although other orientations are possible. This will generally give the housing a vertical orientation.

Preferably the formation of the outlets in the distributor region is helical, spiral or other suitable arrangement and creates a liquid sheet or sheets in a helical pattern or that other suitable arrangement which ideally extends to the radial boundaries of the gas and liquid phase contacting space (i.e. to the inner wall of the vessel). The pitch of the slit or slits is preferably in the range of 0.2 to 6 times the liquid distribution tube outer diameter, more preferably 3 to 3.5 times liquid distribution tube outer diameter. This equates to a pitch angle of approximately 45 degrees.

The distributor apparatus may be formed from a single housing. Alternatively the distributor apparatus may be of modular construction so that the multiple housings are aligned axially. Preferably, each housing has a separate liquid collection region and a pump for each liquid collection region.

In one embodiment, the apparatus further comprises an adjustment device comprising a rod located within an internal passage of the housing and extending along the central axis of the housing; and rod is attached to the housing by an adjustment arm, the adjustment arm being moveable relative to the housing or rod, such that it is able to compress or stretch the housing to thereby reduce or enlarge the width of the liquid outlet. The movement of the adjustment arm relative to the housing or rod may be achieved through a screw mechanism or the like. A key component of the invention is the liquid sheet which functions as a mass transfer and preferably a transport medium to the gaseous phase. In the context of this and other aspects of the invention, a liquid sheet is a stream of liquid which, at least initially, is continuous along the length of the liquid outlet or slit shaped orifice. In order to form a liquid sheet from the liquid outlet, the liquid outlet ideally should be an orifice having a continuous opening along its length. The depth of the orifice and the velocity of the liquid passing through the orifice will also impact upon whether the liquid exiting the orifice is in the form of a liquid sheet. The person skilled in the art is readily able to design the orifice to produce a liquid sheet for a given liquid and flowrate.

Preferably, the liquid outlets or slits have an aspect ratio greater than about 5, so that the length dimension of the slit is about 5 times the width dimension. More preferably, the slits have an aspect ratio of greater than about 10, even more preferably greater than about 20 and yet even more preferably greater than about 50.

Preferably, the length of the liquid outlets or slits extending along the length of the housing is at least 2 times the effective diameter of the housing (i.e. >2 D), more preferably greater than 4 D, even more preferably at least 6 D, yet even more preferably at least 10 D and most preferably at least 20 D. For the purposes of this invention, the effective diameter of the housing is the diameter determined from converting the cross-section area of the housing into a circle. Preferably, the length of the liquid sheet is approximately the length of the liquid outlet from which they are derived.

Preferably, a plane running parallel though the axis of the housing will intersect at least 2, more preferably at least 4, even more preferably at least 8 times and yet even more preferably at least 16 times through the at least one liquid outlet or arrangement of liquid outlets. This configuration of the liquid outlet(s) assists the liquid sheets formed therefrom to function as the walls of a conveying gas channel which contains and transfers the gas phase.

The liquid outlets may also include an arrangement of slit shaped orifices in an arrangement, preferably a helical arrangement. In embodiments in which the slit shaped orifices are in a helical arrangement, the slit preferably extends at least 2 turns (i.e. at least 720 degrees), even more preferably at least 5 turns, yet even more preferably at least 10 turns and most preferably at least 20 turns around the housing. The greater the number of turns, the greater the length of the gas channel that the resulting liquid sheets form, which thereby enables the residence time of the gas in the gas and liquid contacting space to be increased, thus increasing mass transfer between the gas and liquid phase. It will be understood that the number of turns may be spread across one or more modular sections of the gas and liquid contactor (as illustrated in FIG. 2) to avoid the liquid phase becoming saturated with target components from the gaseous phase.

The width of the liquid outlets may be adjusted by an adjustment device. As the material of the housing has an amount of resilience, the adjustment mechanism preferably adjusts the length of the rotating housing, thus adjusting the width of the liquid outlets. By contracting the axial distance between the ends of the housing the width of the outlets reduces and similarly by lengthening the distance between the ends, the width of the outlets increases. In a preferred form, the adjustment mechanism may be a mechanical device. The adjustment mechanism preferably includes a central rod positioned centrally of the rotatable housing, the central rod having ends engaging with the rotatable housing. The width of the liquid outlets is adjusted by adjusting the length of the central rod in the rotatable housing. This may be achieved by varying the distance between the ends of the central rod engaging with the rotatable housing. One of the ends of the rod may be provided with a screw thread which engages with a complementary thread on the central rod. By winding the rod in or out of the screw thread, the width of the outlets can be decreased or increased.

The gas in the gas and liquid phase contacting space is preferably directed between liquid sheets projected from the outlets of the housing causing the gas to flow through the gas and liquid phase contacting space in a path driven by the rotational motion of the liquid leaving the distributor apparatus.

The gas and liquid phase contacting space is preferably defined by the contact surfaces or sides of the liquid sheet or sheets and the external surface of the housing. The external surface of the housing may be at least partially covered by the liquid phase, by nature of its proximity to the liquid sheet from which liquid may emit onto the surface of the external surface of the housing. To this extent, the external surface of the housing also comprises this incidental coating of liquid.

The liquid sheets preferably extend from the liquid outlets from the housing to the internal wall of the vessel. Once the liquid sheets contact the internal wall of the vessel, it travels along the internal wall towards the liquid outlet of the vessel.

In contrast to conventional gas and liquid phase contactors, the configuration defined under the present invention provides a large interfacial surface area through which both free surfaces of the liquid sheet(s) form part of the gas and liquid phase contacting space. As the gas and liquid contact in the space or void between the rotatable housing and the inner wall of the vessel, the space preferably has an annular configuration. To minimise the proportion of the gas and liquid phase contacting space in which none or only one side of the liquid sheet forms part of the gas and liquid phase contacting space, the distance that the liquid sheet travels from the liquid outlet to the inner wall of the vessel is increased and/or the distance between each liquid sheet (e.g. vertical distance when housing is vertically mounted) is reduced. This arrangement minimises the proportion of the gas and liquid phase contacting space which is defined by the external surface of the housing (no liquid sheet interface) or the internal wall of the vessel (interface with one side of the liquid sheet). The rotating liquid sheets form gas channels defined by the contacting surfaces of the liquid sheets, the external surface of the housing and the internal surface of the vessel. The rotating motion of the liquid sheets drives or pumps the gas through the space between the housing and the internal surface of the vessel in an auger or screw thread action. When the outlets are arranged in a helical or spiral arrangement around the housing, the liquid sheets form a helical or spiral arrangement around the housing in an annular space.

Accordingly, from a cross-sectional view through the vessel, the number of contacting spaces on either side of the housing within the vessel is preferably at least 4 (FIG. 1 illustrates 4 contacting spaces), more preferably at least 10, even more preferably at least 30 and yet even more preferably at least 50.

After passing through the gas and liquid phase contacting space, the gas may then be exhausted from the gas and liquid phase contacting vessel through a gas outlet.

The liquid may be collected in at least one liquid collection region and removed through a liquid outlet.

In the context of a gas liquid contacting apparatus, the liquid absorbs or desorbs a component of the gas in the gas and liquid phase contacting space and so the liquid in the liquid collection region is higher/lower in that component of the gas than liquid entering the vessel. This liquid may subsequently be passed to a desorption/absorption process to reclaim/strip the component or at least a portion of the stream may be recycled to re-enter the distributor apparatus.

In contrast to existing packed bed columns, the gas and liquid phase contactor of the present invention has the ability to be optimised for different gas/liquid systems. For example, the contactable surface area may be adjusted through the liquid mass flow rate; the dimensions of the liquid distributor, which themselves can be adjusted by a suitable mechanism such as that associated with the central rod; and the rotation rate of the liquid distributor. This ability to dynamically adjust the gas and liquid phase contactor enables mass transfer rates to be continuously optimised for a gas and liquid phase system as well as enabling the one gas and liquid phase contactor to be used for different applications each requiring different parameter settings.

Preferably, the apparatus of the first aspect or the gas and liquid phase contactor of the second aspect of the present invention further comprise a control unit. The control unit preferably comprises a computer aided control system or is configured to control the liquid distributer or the gas and liquid phase contactor algorithms to control and optimise mass, heat and/or momentum transfer between the gaseous and liquid phases. The computerised control system preferably comprises computer software comprising algorithms that control and optimise mass, heat and/or momentum transfer between the gaseous and liquid phases. The algorithm or algorithms preferably use chemical and process parameters of the gas liquid system, such as the liquid's viscosity and available mass transfer data. Preferably, the algorithm or algorithms can use performance data of the apparatus or gas and liquid phase contactor to provide correlated equations to further optimise the process.

Preferably, the algorithm or algorithms set operating parameters to maximize the mass transfer performance of the device while minimizing the energy requirements of the process. Liquid and gas flowrates are preferably set by the algorithm to meet the specific process and performance requirements while the algorithm or algorithms are able to further adjust the rotation rate and the gap spacing such that the fluid dynamic performance is maintained over a required range of performance. The width of the liquid opening may be controlled by means of a mechanical adjustment of the length of the housing. The stability of the liquid sheet is determined by the viscosity and surface tension of the liquid, the velocity and thickness of the sheet which diminishes as the liquid extends out from the liquid distributor. Preferably the algorithm or algorithms maximize the overall performance by adjusting the operating parameters to maximize both the mass transfer and the gaseous output or pumping capacity.

In a third aspect, the first or second aspect is used in the absorption and/or desorption of gases in PCC.

In a fourth aspect, there is provided a process for desorption and/or absorption of a gas phase with a liquid phase comprising the steps of:
(A) providing a pressurised source of liquid to a housing comprising at least one liquid outlet or arrangement of liquid outlets arranged in a formation in and around the housing;
(B) forming the pressurised liquid phase in the housing into at least one liquid sheet by projecting the pressurised liquid in the housing from the housing through the at least one liquid outlet or arrangement of liquid outlets in the housing; each liquid sheet comprising two sides; and
(C) contacting the gas phase with each side of the two sides of the at least one liquid sheet,
wherein the at least one liquid sheet forms at least part of a gas channel wall defining a gas and liquid phase contacting space through which the gas phase flows and wherein the at least one liquid sheet is in rotational motion around a central axis of the housing.

Preferably the liquid sheet makes up at least 50%, more preferably at least 70% and even more preferably at least 90% of the total surface area of the gas channel wall.

The liquid phase may be a slurry (solid/liquid phase) or an emulsion (mixed liquid phase). In embodiments when the liquid phase is a slurry, the width of the liquid outlet is preferably less than 25%, and more preferably less than 15% of the mean maximum diameter of the particles in the slurry mixture. This assists in preventing the solid particles blocking the liquid outlet.

Preferably, the gas is transported through the vessel by the action of the at least one liquid sheets in rotational motion around a central axis.

Preferably, a control unit, as previously described, is used to implement the process according to this aspect and may be used to form the at least one liquid sheet from the liquid phase.

In one embodiment the gas and liquid phase contacting space is a single helical gas channel. In alternative embodiments, the liquid contacting space comprises multiple gas channels, either helical or the resulting multiple pathways which exists around the liquid sheets projected from the liquid outlets.

The rotational motion of the liquid phase is preferably generated by a rotational drive arrangement to rotate the distributor apparatus about its axis of rotation which may be provided in the first and/or second aspect of the present invention. Preferably the gas is transported through the gas channel substantially by means of the rotational motion of the liquid sheet (i.e. no or minimal external pumping means for the gas is required.).

The geometry of the contacting space or gas channel (e.g. length, turns and pitch etc) may be designed to suit a particular application.

In a fifth aspect, there is provided a control unit characterised by means which are designed to carry out the process of the fourth aspect of the present invention.

As used herein, except where the context requires otherwise, the term "comprise" and variations of the term, such as "comprising", "comprises" and "comprised", are not intended to exclude further additives, components, integers or steps.

For the purposes of the present invention, the use of the singular form shall also encompass that of the plural form, unless otherwise indicated.

For the purposes of the present invention, the term liquid sheet is a two sided liquid sheet (i.e. both free surfaces are in contact with a gaseous phase), unless otherwise indicated. Reference to the liquid coated inner wall of the vessel is reference to a single sided liquid sheet.

For the purposes of the present invention, the term "projected" means to send out into space.

BRIEF DESCRIPTION OF THE DRAWINGS/FIGURES

DETAILED DESCRIPTION OF THE EMBODIMENTS

The invention has been developed to address the limitations of existing processes in the area of the capture of carbon dioxide ($CO_2$) from industrial flue gases. However, as a gas-liquid contacting device, the invention has application in any area where gas streams and liquid streams are brought together with the intent of transferring mass, momentum or heat. Examples include but are not limited to chemical processes where interaction between gases and liquids are required, to the capture of pollutants such as volatile organic compounds (VOC's); sulphur and nitrogen oxides (SOx, NOx), distillation processes, for example in the oil and gas industries, cryogenic gas and chemical processing industries, pharmaceutical industries. Other uses may include air conditioning, evaporative heating and cooling applications.

Figure 1:
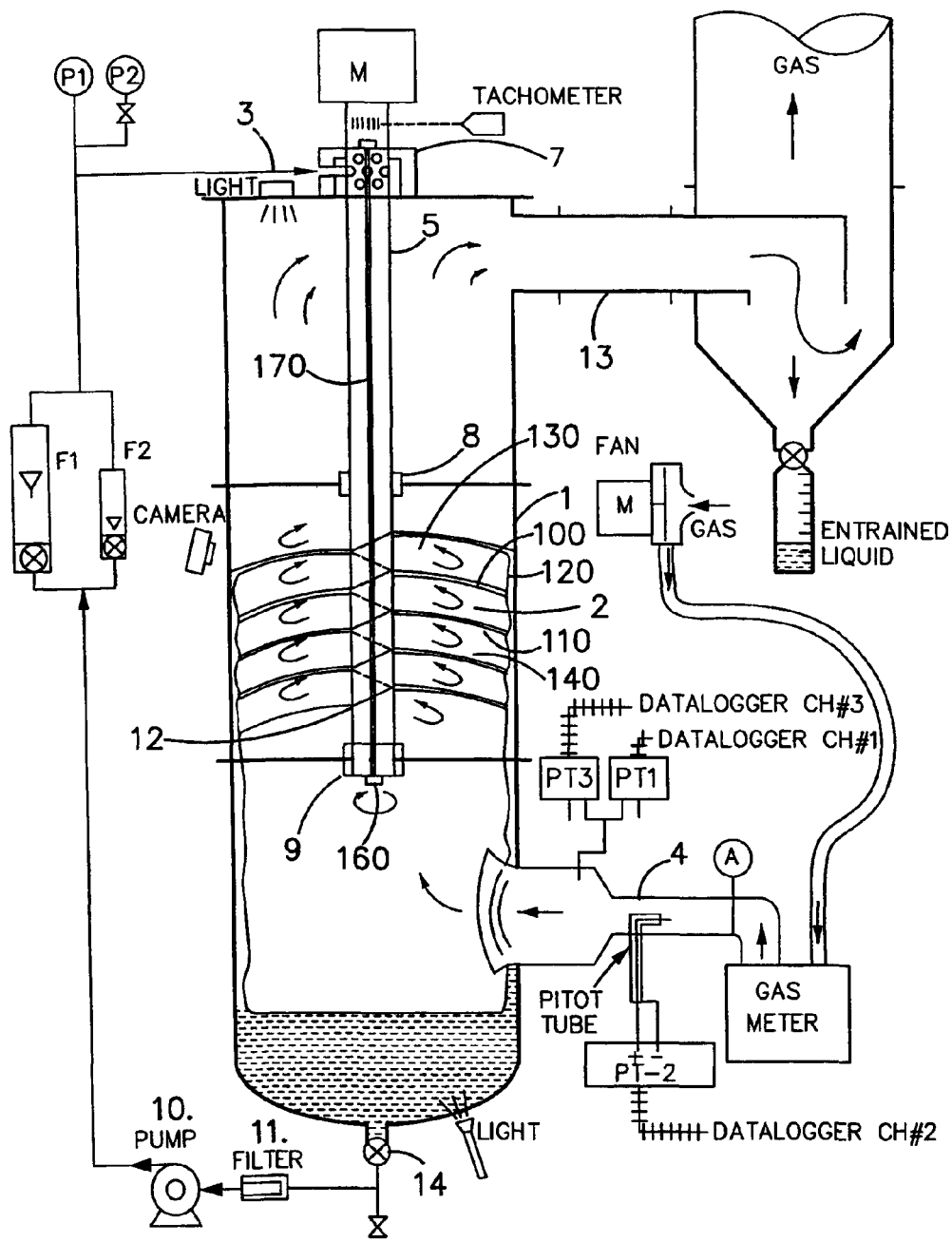
FIG. 1 is a schematic diagram of a flow visualisation demonstrating the liquid and gas flows in an apparatus in accordance with the invention.

Referring to FIG. 1, a gas and liquid phase contacting apparatus according to the invention is shown comprising a vessel 1 having a liquid inlet 3 and a gas inlet 4. The vessel 1 preferably has an outer diameter of at least 100 mm and more preferably at least 500 mm. These dimensions are likely to be suitable for fine chemical type applications. Larger commercial applications, including PCC, preferably have an outer diameter of at least 1 m, preferably at least 5 m and most preferably at least 10 m. Typically, for manufacturing reasons, a maximum diameter of no more than 15 m or 20 m is used.

The liquid entry inlet 3 is preferably directed under pressure into a distributor apparatus 5 comprising a housing 5 mounted for rotation about its longitudinal access on bearings 7, 8, 9. A motor M is provided to rotate the housing 5 about its axis. The distributor apparatus 5 which in most circumstances will have a vertical orientation is provided with one or more outlets formed in a distributor region of the wall of the housing. The outlet in FIG. 1 is shown as a single continuous slit 12 formed in the wall of the housing. The vicinity of the liquid outlet or outlets in the housing defines the gas and liquid phase contacting space 2 in the vessel 1. The contacting space 2 is preferably defined by the liquid sheets 100, 110, a liquid coated inner wall of the vessel (120) and the external surface of the housing 5. Liquid sheets 100, 110 also form part of a gas channel wall of contacting spaces 130, 140, which communicate with contacting space 2 as part of the helical contacting space which defines the gaseous phase pathway through the vessel 1.

Pump 10 is provided to supply liquid at pressure to the distributor apparatus through inlet 3. Liquid pumped into housing 5 projects through liquid outlets 12 in a pattern dependent on the orientation of the liquid outlets to the housing wall. In accordance with the invention, the liquid outlets from the housing are arranged to project liquid in a thin sheet of liquid, a distance preferably corresponding to the radius of the vessel 1. The pressure required will be dependent upon a number of parameters including liquid viscosity, film thickness and vessel diameter and gas channel geometry. However the liquid pressure should be such that a positive hydrostatic pressure is maintained at the top of the distributor housing to maintain a continuous supply of liquid in the housing 5 and a continuous liquid sheet 100, 110 is projected from the outlets 12. In practice, the pressure limit is essentially dictated by economics (cost of pump and power versus advantage). It is expected that a pressure of up to 12 barg (single stage centrifugal pump) could be maintained but the pressure could be up to 120 barg (multi-stage centrifugal pump).

The thickness of the thin sheet is preferably as low as possible while maintaining sheet stability. By operating just above the point of break up, high mass transfer may be achieved. Typical mean sheet thicknesses are in the range of 0.1 mm to 20 mm and preferably in the range 0.5 mm to 10 mm and more preferably 1.0 mm to 5.0 mm. In general lower thicknesses lead to sheet instability, while higher thicknesses reduce mass transfer efficiencies. A liquid sheet is a stream of liquid which, at least initially, is continuous along the length of the liquid outlet. The liquid sheet may thin as it progresses from the liquid distributor to the inner wall of the vessel (due to mass balance considerations) and should, by appropriate choice of design parameters, remain intact and unbroken over most (e.g. preferably at least 50%, more preferably 80%, most preferably at least 90%) if not all of the distance to the inner wall of the vessel. The sheets may break up into droplets before they contact the wall due to surface tension effects referred to as Raleigh instability but this break up should occur as close to the wall as possible and preferably not at all. Preferably any liquid sheet break up is such that the mass transfer rate and/or gas pumping rate is reduced by no more than 30% and preferably no more than 10% relative to when no liquid sheet break up occurs.

In order to form a liquid sheet from the liquid outlet, the liquid outlet ideally should be an orifice with a continuous opening along its length. The liquid outlets ideally are a slit shaped orifice or arrangement of slit shaped orifices formed in the distributor region of the housing. The outlets in the housing are arranged so that liquid projected from the housing forms a helical thin sheet through the gas and liquid phase contacting space 2 in vessel 1.

In operation, liquid is pumped into housing 5 through inlet 3 and housing 5 rotated about its axis. The liquid is projected from housing 5 in an advantageous pattern (e.g. helical shape for lower flow rate and turbine blade for higher flow rate) across the full width of the gas and liquid phase contacting space 2. Gas entering vessel 1 through gas inlet 4 is directed into gas and liquid phase contacting space 2 where the gas preferentially passes between the thin liquid sheets projecting from housing 1. The rotation of housing 5 imparts a rotational motion to the projecting liquid sheets. The rotational motion of the liquid sheets act to pump the gas through the gas contacting region between the liquid sheets maximising contact between the gas and liquid phases in the gas and liquid phase contacting space 2.

After passing through the gas and liquid phase contacting space, the gas passes to gas outlet 13. The liquid sheets preferably contact the walls of the vessel in the gas liquid contacting space 2 and run down to a liquid collecting region before exiting the vessel 1 through outlet 14. However, at least a portion of the liquid may then be recycled to the liquid inlet of the vessel to further improve the performance of the vessel.

The apparatus of FIG. 1 is preferably further provided with a filter 11 in the liquid line to the pump 10 as well as instrumentation to measure the flow rate and pressure of liquid to the liquid inlet 3 and a device to measure the speed of rotation of housing 5. The gas inlet is preferably provided with a fan to move the gas into the vessel 1 and instrumentation to measure the flow rate of the gas.

Figure 2:
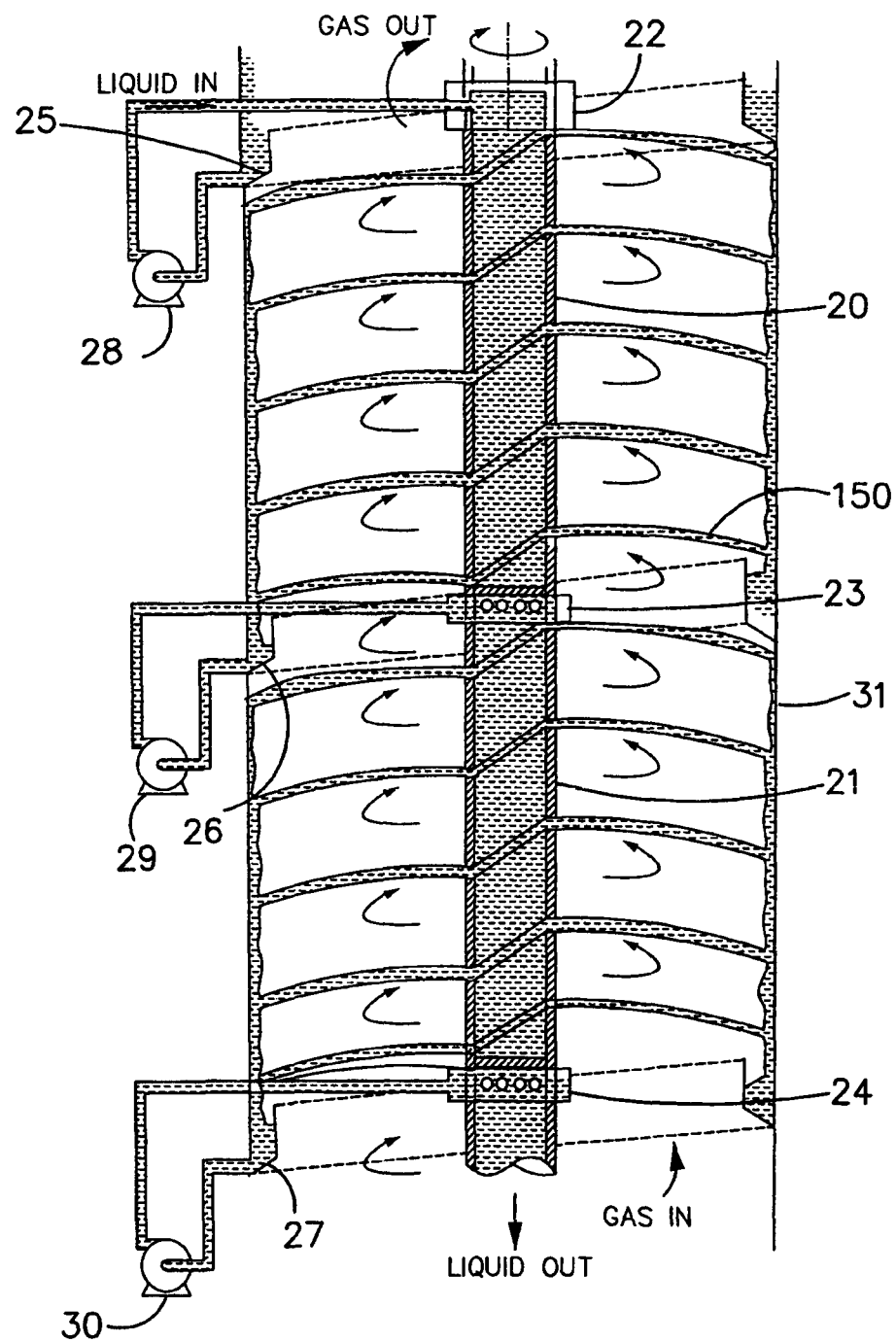
FIG. 2 is a schematic diagram of a distributor apparatus of the invention where the housing is a modular design of two components.

In an alternative embodiment of the distributor apparatus and apparatus of the invention shown in FIG. 2, the distributor apparatus comprises two (or more) housings 20, 21 aligned and mounted for rotation about their longitudinal axis on bearings 22, 23, 24.

Each of the bearings provides a liquid inlet to the housings with a pump supplying liquid to each inlet. Multiple liquid collecting regions 25, 26, 27 are provided adjacent the wall of the vessel 31 to collect liquid which is supplied to the suction side of pumps 28, 29, 30. The number of liquid collecting regions generally corresponds to the number of pumps.

The liquid outlets in each of the sections of the housings 20, 21 are arranged to project sheets of liquid 150 from the housing as described in regard to FIG. 1. Liquid and Gas outlets as shown in FIG. 2 could proceed to additional modules mounted preferably above and/or below those shown in FIG. 2.

Figure 3:
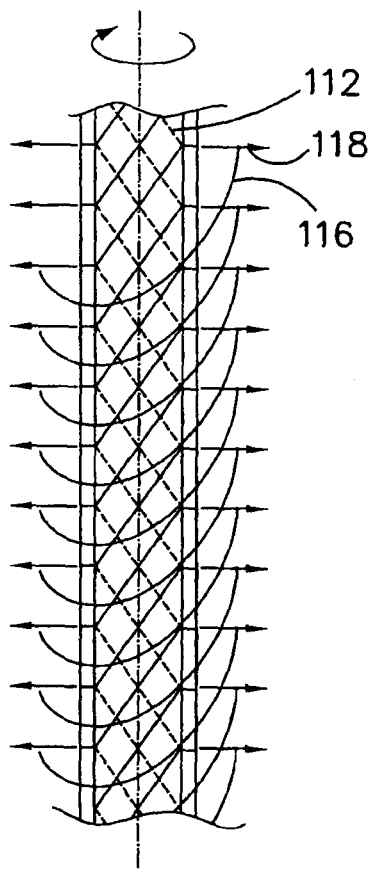
FIG. 3 is a schematic view of possible arrangements of slots which could be used in the invention.
Figure 3:
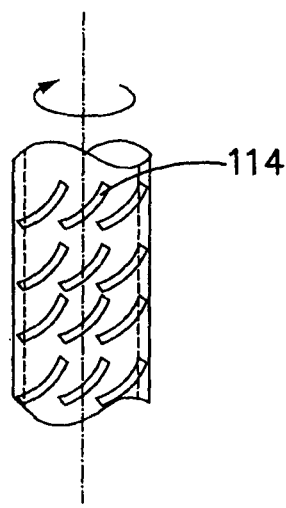

FIG. 3 is a schematic diagram showing alternate arrangements of liquid outlets 112 within the scope of the invention. As shown in FIG. 3a, the slots 112 may be arranged to form a helix or multiple start helixes such as double, triple or quadruple helixes. The 3D shape of the liquid sheets 116 (with reference to a horizontal projection line 118) are illustrated projecting from the liquid outlets 112.

In the alternate designs shown in FIG. 3b, the slots 114 may be arranged so that multiple discreet sheets of liquid project from the housing but these multiple sheets are still arranged in a suitable pattern (e.g. such as that mimicking a turbine blade) to provide the necessary pumping action to the gas. The multiple liquid sheets which project from the configuration illustrated in FIG. 3b act as rotating blades which extend the length of the gaseous pathway or gas channel and hence the contact time of the gaseous and liquid phase within the contacting space.

EXAMPLE

Figure 4A:
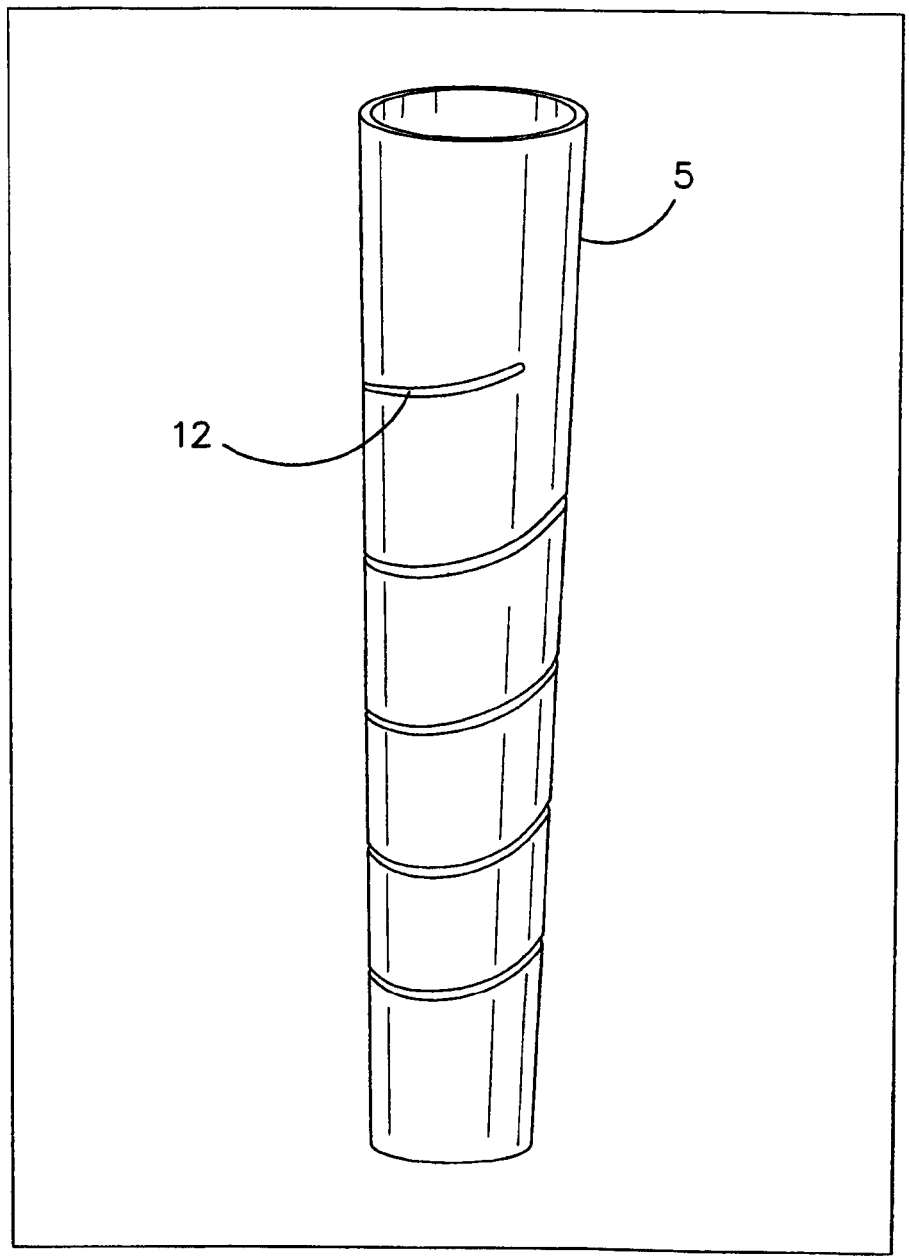
FIG. 4(a) is a schematic diagram of a liquid discharge tube in accordance with the invention.

The experimental rig in accordance with FIG. 1 was set up. The key component of the invention is the rotating distributor apparatus (FIG. 4a) which is a tube or housing 5 of outside diameter 25 mm with a thin (1-2 mm) slit 12 cut in the tube in the shape of a helix of pitch 22 mm traversing the tube several times (4-5 times in our experiments). This corresponds to the pitch as being 0.88 times diameter and the slit as 0.04 to 0.1 times diameter. The gap spacing of the slit (i.e. the width of the liquid outlets) may be adjusted by an adjustment device. The adjustment mechanism 160 preferably adjusts the length of the rotating housing, thus adjusting the width of the liquid outlets. In a preferred form, the adjustment mechanism 160 may be a mechanical device. The adjustment mechanism preferably includes a central rod 170 positioned centrally of the rotatable housing, the central rod 170 having ends engaging with the rotatable housing 5. The width of the liquid outlets 12 is adjusted by adjusting the length of the central rod 170 in the rotatable housing 5. This may be achieved by varying the distance between the ends of the central rod engaging with the rotatable housing. One of the ends of the rod 160 may be provided with a screw thread which engages with a complementary thread on the central rod.

Preferably, the length of the slits extending along the length of the housing is at least 2 times the effective diameter of the housing (i.e. >2 D), more preferably greater than 4 D, even more preferably at least 6 D, yet even more preferably at least 10 D and most preferably at least 20 D. For the purposes of this invention, the effective diameter of the housing is the diameter determined from converting the cross-section area of the housing into a circle.

Preferably, a plane running parallel though the axis of the housing will intersect at least 2, more preferably at least 4, even more preferably at least 8 times and yet even more preferably at least 16 times through the at least one liquid outlet or arrangement of liquid outlets. This configuration of the liquid outlet(s) assists the liquid sheets formed therefrom to function as the walls of a conveying gas channel which contains and transfers the gas phase.

Liquid enters the tube from the top at a controlled flowrate via a rotating seal at the top of the tube. The bottom of the tube is plugged and water exits the tube through the helical slit as a continuous liquid sheet or (at higher flowrates or rotation rates) as a spray. The tube is rotated with a suitable motor at a controlled speed (0-950 rpm tested experimentally (much higher rotation rates have been tested using the CFD (computational fluid dynamics) model and may be advantageous). The rotation of the tube imparts a centrifugal force to the liquid and a motion to the liquid sheet resembling an Archimedes screw.

Figure 4B:
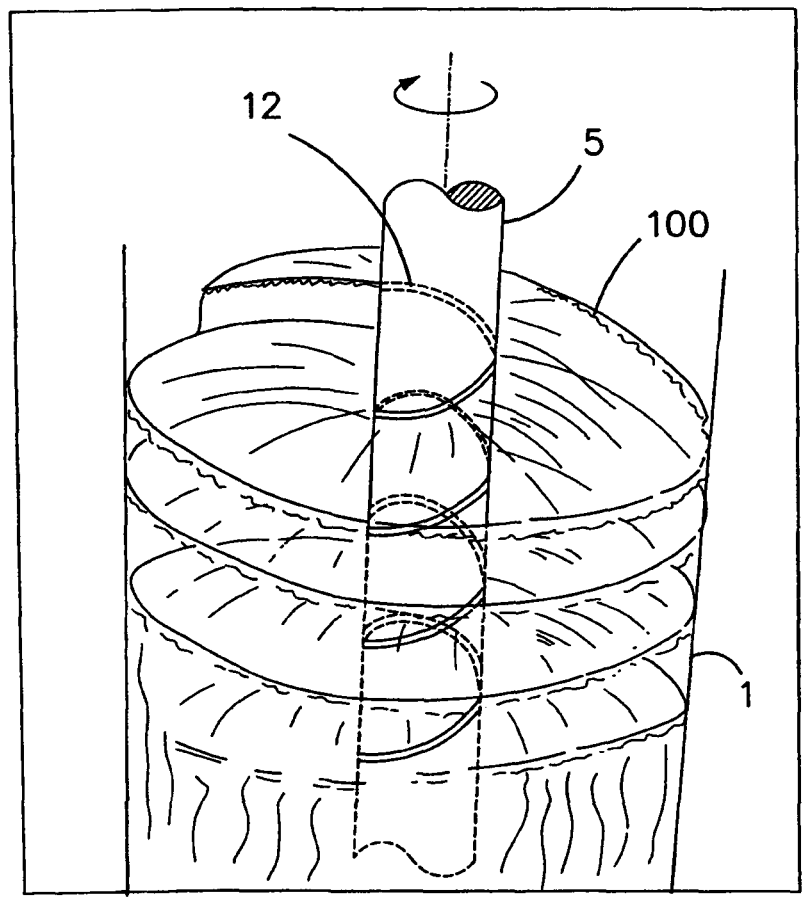
FIG. 4(b) is a schematic diagram of the embodiment of FIG. 4(a) in operation.

Experiments proceed by setting a liquid flowrate which produces an even shape to the liquid sheet 100 (shown in FIG. 4b) which is a function of the gap 12 and helical cut tube design and setting a forced draught gas rate (most often set to zero so that the natural pumping action of the device is being measured). The tube rotation rate is varied in steps from zero to over 900 rpm with each step maintained for a minimum of 10 minutes. At a given tube rotation rate, the gas rate or the liquid rate may also be varied in stepped values. For each step pressure and velocity (pitot tube) measurements at the gas inlet are data-logged at 1 sec intervals. Two pressure transducers are in normal and reverse polarity to be able to measure positive and negative gauge pressures.

Figure 5:
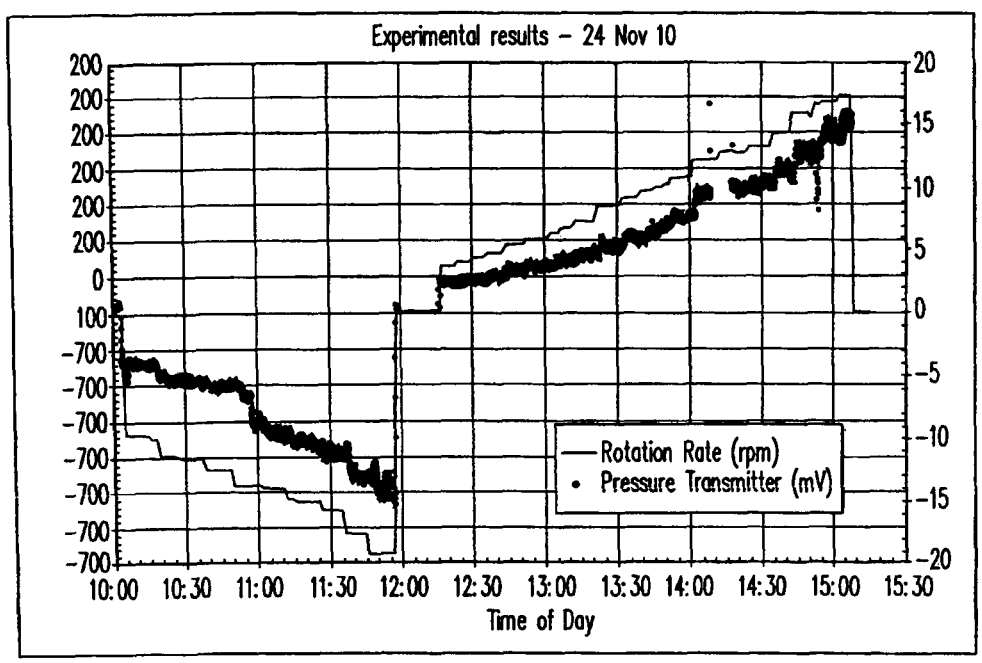
FIG. 5 is a graph of the pressure at the gas inlet line as a function of rotation rate in clockwise (negative rpm—pumping up) and counter-clockwise (positive rpm—pumping down) directions. For these measurements the gas inlet is closed at plane 'A' as shown in FIG. 1.

To confirm the pumping action in an early experiment the gas inlet 4 was disconnected from the gas meter and the line sealed. At increasing clockwise rotation rate (pumping upwards) the pressure in the sealed gas inlet line decreased in steps corresponding to the rotation rate. Reversing the direction of rotation (anti-clockwise—pumping downwards) resulted in a stepped increase in pressure at the gas inlet with each step increase in the rotation rate of the tube as shown in FIG. 5. The appropriate response to both rotation directions confirmed that the pumping action was a real phenomenon and not an artefact of the experiment or rig design.

It has been shown experimentally that the motion of the liquid sheet emanating from the rotated tube will drive a gas flow through the column which relates directly to the speed and direction of motion of the screw or blades formed from the liquid sheets 100 projecting from the distributor apparatus 5. This result would be entirely expected if the helical screw or blades was a solid structure (as in an auger, turbine or compressor). The advantage of the use of liquid to form the surface of the screw or blade is that now there is intimate contact between both free surfaces of the liquid sheet and the gas (which is travelling in a pattern in the interstices between the leaves of the liquid screw or blades driven by the motion of the liquid) and a high surface area is attained without the need for a solid packing material (which adds cost and pressure drop) or the need for the formation of fine droplets (which adds to entrainment). Mass transfer measurements can be estimated from the relative velocities of the gas and liquid. Most experiments have been carried out with natural draught (fan not running) though it has been shown that the shape of the liquid sheet remains stable over a range of imposed gas flows. Experimental results so far show that the critical factors are the design and tolerances of the tube and the one or more slits (gap width, length and shape), design of inlet piping and seal, liquid discharge rate, gas flow rate (for forced draught operation) and tube rotation rate. Other key parameters are the liquid properties (especially viscosity), gas properties, shapes other than helical screw (e.g. fan or compressor blade shapes), other orientations (in principle this device could operate in any orientation e.g. horizontally).

Conventional sprays have also been tested on the test rig and found to have much higher entrainment rates at given gas and liquid flowrates. This information is being evaluated to quantify the advantage of this device over conventional systems.

A liquid contactor of the type described can impart a pumping action to the gas which is related to the shape and nature of the liquid sheet, the liquid flow rate and the rotation rate of the distributor apparatus. Surface areas and relative velocities can be measured and used to estimate the mass transfer rate to allow comparison with conventional devices.

A major alternative design is the use of bladed liquid sheet similar in concept to the blades of a turbine, compressor or jet engine which may prove to be more suitable at higher rotation rates and liquid velocities.

The gas and liquid phase contactor of the present invention may further comprise a control unit. The control unit preferably comprises a computer aided control system or is configured to control the liquid distributer or the gas and liquid phase contactor by algorithms or process steps to control and optimise mass, heat and/or momentum transfer between the gaseous and liquid phases. The computer aided control system may comprise computer software comprising algorithms that control and optimise mass, heat and/or momentum transfer between the gaseous and liquid phases. The algorithm or algorithms may use chemical and process parameters of the gas liquid system, such as the liquid's viscosity and available mass transfer data. The algorithm or algorithms can use performance data of the apparatus or gas and liquid phase contactor to provide correlated equations to further optimise the process.

The algorithm or algorithms may set operating parameters to maximize the mass transfer performance of the device while minimizing the energy requirements of the process. Liquid and gas flowrates may be set by the algorithm to meet the specific process and performance requirements while the algorithm or algorithms preferably are able to further adjust the rotation rate and the gap spacing such that the fluid dynamic performance is maintained over a required range of performance.

The width of the liquid opening may be controlled by means of a mechanical adjustment of the length of the housing. The stability of the liquid sheet is determined by the viscosity and surface tension of the liquid, the velocity and thickness of the sheet which diminishes as the liquid extends out from the liquid distributor. The algorithm or algorithms maximize the overall performance by adjusting the operating parameters to maximize both the mass transfer and the gaseous output or pumping capacity.

It will be understood that the invention disclosed and defined in this specification extends to all alternative combinations of two or more of the individual features mentioned or evident from the text or drawings. All of these different combinations constitute various alternative aspects of the invention.

The claim defining the invention are as follows:

1. A gas and liquid phase contactor comprising
    a vessel comprising an inner wall; a pressurised source of liquid; and a gas inlet communicating with a gas and liquid phase contacting space within the vessel,
    a distributor apparatus for distributing liquid in the vessel, comprising
    at least one housing rotatable about an axis of the housing;
    each rotatable housing having a distributor region comprising at least one liquid outlet or arrangement of liquid outlets arranged in a formation in and around the housing for directing liquid through the gas liquid contacting space towards the inner wall of the vessel,
    the distributor apparatus having a liquid inlet for introducing liquid into the housing from the pressurised source of liquid and providing pressurised liquid to the at least one liquid outlet or arrangement of liquid outlets, the pressurised liquid in the housing projecting from the housing as at least one liquid sheet rotating around a central axis of the housing towards the inner wall of the vessel;
    the liquid sheets having two sides and the gas inlet directing gas through the gas liquid contacting space into contact with each side of the at least one liquid sheets projected from the outlets in the housing,
    wherein the formation of the outlets in and around the housing is helical or spiral and creates a liquid sheet or sheets in a helical or spiral pattern extending towards the radial boundaries of the gas and liquid phase contacting space, and wherein the pitch of the outlets is in the range of 0.2 to 6 times the outer diameter of the housing.

2. The gas and liquid phase contactor of claim 1 wherein the liquid outlets are a slit shaped orifice or arrangement of slit shaped orifices formed in the distributor region of the housing.

3. The gas and liquid phase contactor of claim 2 wherein each liquid outlet or outlets is an orifice having a continuous opening along its length.

4. The gas and liquid phase contactor of claim 1 wherein the housing of the distributor apparatus is axially aligned with the gas and liquid phase contacting space.

5. The gas and liquid phase contactor of claim 4 further comprising an adjustment mechanism the adjustment mechanism comprising a central rod positioned centrally of the rotatable housing, the central rod having ends engaging with the rotatable housing, the width of the liquid outlets being adjusted by adjusting the length of the central rod in the rotatable housing to contract the housing and the width of the liquid outlets.

6. The gas and liquid phase contactor of claim 1, wherein the length of the liquid outlets or the formation of outlets extending around the housing over the length of the housing is at least 2 times the effective diameter of the housing.

7. The gas and liquid phase contactor of claim 1 wherein gas is caused to flow through the gas and liquid phase contacting space in a helical or spiral path driven by the rotational motion of the liquid sheet or sheets projected from the distributor apparatus.

8. A method for the absorption and/or desorption of gas in post combustion $CO_2$ capture comprising contacting the gas with the gas and liquid phase contactor of claim 1.

* * * * *